C. H. CHAPMAN.
HOSE COUPLING.
APPLICATION FILED JULY 18, 1908.
913,259.
Patented Feb. 23, 1909.
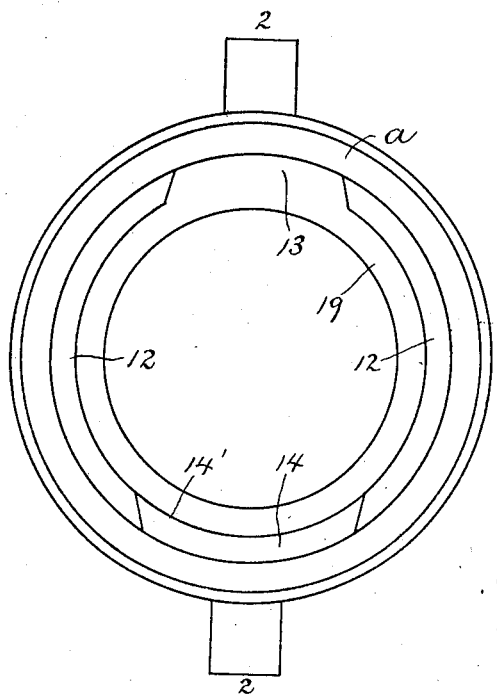
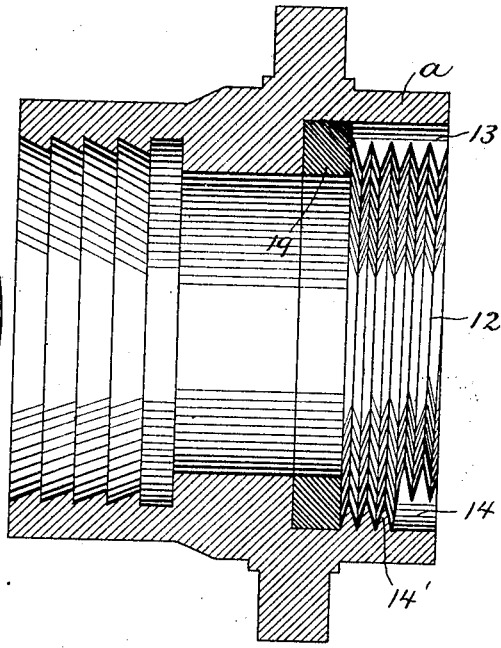
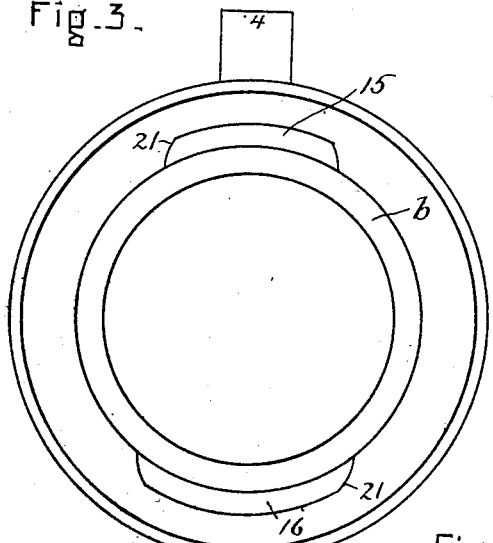
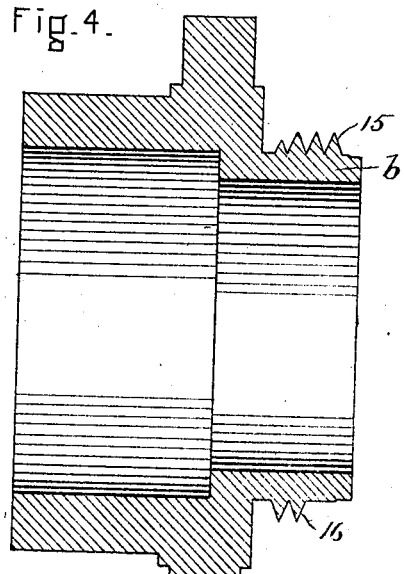
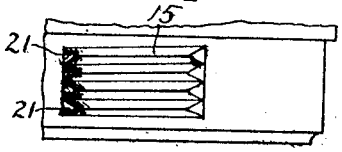
WITNESSES
INVENTOR
C. H. Chapman
ATTORNEYS

UNITED STATES PATENT OFFICE.

CHARLES H. CHAPMAN, OF WINCHESTER, MASSACHUSETTS, ASSIGNOR TO LIGHTNING HOSE-COUPLING COMPANY, A CORPORATION OF MASSACHUSETTS.

HOSE-COUPLING.

No. 913,259.  Specification of Letters Patent.  Patented Feb. 23, 1909.

Application filed July 18, 1908. Serial No. 444,216.

REISSUED

*To all whom it may concern:*

Be it known that I, CHARLES H. CHAPMAN, of Winchester, in the county of Middlesex and State of Massachusetts, have invented certain new and useful Improvements in Hose-Couplings, of which the following is a specification.

This invention has for its object to provide a hose coupling, the members of which have a screw-thread connection, and are adapted to be connected and disconnected without the delay incidental to a complete connection and disconnection by the rotation of one of the members.

The invention is embodied in a coupling comprising a male member and a female member, the screw threads of which are interrupted to form on the male member two screw-thread segments of different length, and in the female member three recesses separating two series of internal thread segments, the length of the recesses of the female member corresponding with the length of the projecting thread segments of the male member, and the arrangement being such that the recesses of the female member will receive the projections of the male member when the parts are in only one relative position, provision being thus made for quickly engaging the two members and preventing their disengagement by any forward rotary movement of one of the members relatively to the other, short of a complete rotation; so that when the two members are connected and their threads are interengaged, a partial rotation of one member relatively to the other will not permit the separation of the members by a rectilinear movement of one member relatively to the other.

The invention consists in the improvements which I will now proceed to describe and claim.

Of the accompanying drawings, forming a part of this specification,—Figure 1 represents an end elevation of the female member of a coupling embodying my invention. Fig. 2 represents a section on a line between the numerals 2—2 of Fig. 1. Fig. 3 represents an end elevation of the male member of said coupling. Fig. 4 represents a section on a line between the numerals 4—4 of Fig. 3. Fig. 5 represents a side view of the male member.

The same reference characters indicate the same parts in all the figures.

In the drawings, $a$ represents the female member, and $b$ the male member of a hose coupling embodying my invention, said members being adapted to be connected in the usual or any suitable way with the lengths of hose to be connected by the coupling. The female member is provided with an internal screw thread 12, which is interrupted to form two recesses 13 and 14 at opposite sides of the coupling, the recess 13 being considerably shorter than the recess 14, as shown in Fig. 1. The recess 14 does not extend entirely across the internal screw thread 12, a series of segments 14' of the internal thread being left unmolested at the inner end of the recess, as shown in Figs. 1 and 2, said segments extending from the recess 13 around the entire circle back to the recess 13.

The male member is provided with an external screw thread which is interrupted or cut away around the greater portion of the perimeter of the male member to form two series of male thread segments 15 and 16. The segments 15 are shorter than the segments 16, and the two segments are formed to enter respectively the recesses 13 and 14 when the two members are brought together with the male segments 15 coinciding with the recesses 13, and the male segments 16 coinciding with the recesses 14. It will be observed by reference to Fig. 4 that the number of segments in the series 16 is less than that in the series 15.

The described construction enables the two members to be brought into engagement with each other by a rectilinear movement of one of the members in the direction required to cause the male segments to enter the recesses, after which a partial rotation of one of the members relatively to the other will cause an interengagement of the screw threads.

The variation in length between the recesses 13 and 14, and between the male thread segments 15 and 16, and the continuation of the female thread segment 14' across the inner end of the recess 14 prevent the possibility of the separation of the two members by a rectilinear movement of either section relatively to the other after one member has been given a partial rotation from the position it occupied when first engaged with the other member. It will be observed that in case a complete one-half revolution of one member relatively to the other should be required, the male thread segments 16 are of sufficient length to span the recess 13 of the female member, but were it not for the continuous elongated segments 14' extending across the inner end of the recess 14, the segments 15 on the male member being shorter than the recess 14 in the female member the said segments 15 would at once fly out of engagement. By leaving the elongated inner female segments 14' extending across the inner end of the recess 14, and making the number of male segments in the series 16 less than that in the series 15, as shown in Fig. 4, a complete rotation of one member relatively to the other can be effected before any dislodgment can occur, and this is amply sufficient to compensate for any variation in practical use.

The female member is provided with a compressible packing or washer 19 against which the inner end of the male member is seated when the two members are operatively engaged. The compressibility of the washer 19 is such that the male member may be given a half rotation from the position it occupies when first engaged with the female member. If the recesses 13 and 14, and the projecting thread segments 15 and 16 were of equal length, a half rotation of the male member in the female member would disconnect the threads of the said members, and permit the separation of the male member from the female member. This is prevented by the described difference in length between the recesses 13 and 14 and between the thread segments 15 and 16, and by the elongated female thread segments 14' extending across the inner end of the recess 14 in the female member. To facilitate the engagement of the thread segments of the two members, I reduce or round off the leading ends of the male thread segments 15 and 16, as shown at 21 in Figs. 3 and 5, this reduction imparting inward curvatures to the sides of the male thread segments, and giving the leading ends of said segments an approximate wedge shape which enables them to readily find and enter the spaces between the female thread segments.

I claim:

1. A hose coupling comprising a male member having a male screw thread, which is interrupted to form a longer and a shorter series of male thread segments, and a female member having a female screw thread which is interrupted to form longer and shorter recesses separating three series of female thread segments, and adapted to receive the said male thread segments only when the members are brought together with the shorter and longer male thread segments coinciding respectively with the shorter and longer recesses, the female screw thread having elongated inner convolution segments extending across the inner end of the longer recess, substantially as and for the purpose specified.

2. A hose coupling comprising a male member having a male screw thread, which is interrupted to form a longer and a shorter series of male thread segments, the number of segments in one series being greater than that in the other series, and a female member having a female screw thread which is interrupted to form longer and shorter recesses separating three series of female thread segments, and adapted to receive the said male thread segments only when the members are brought together with the shorter and longer male thread segments coinciding respectively with the shorter and longer recesses, the female screw thread having elongated inner convolution segments extending across the inner end of the longer recess, substantially as and for the purpose specified.

In testimony whereof I have affixed my signature, in presence of two witnesses.

CHARLES H. CHAPMAN.

Witnesses:
C. F. BROWN,
P. N. PEZZETTI.